UNITED STATES PATENT OFFICE.

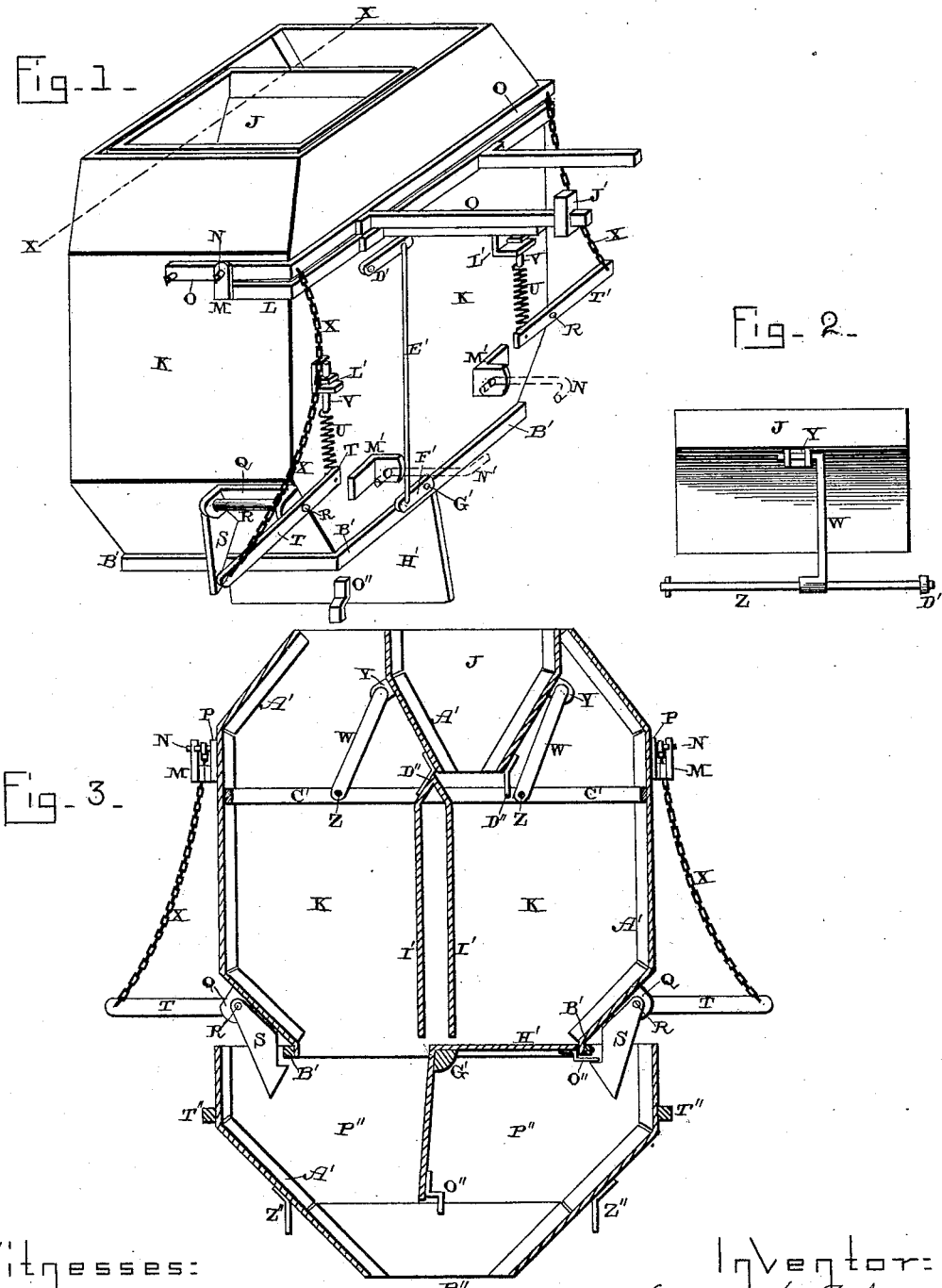

HORACE M. FULWIDER, OF REDMON, ILLINOIS.

GRAIN-WEIGHING MACHINE.

SPECIFICATION forming part of Letters Patent No. 406,722, dated July 9, 1889.

Application filed April 29, 1889. Serial No. 308,982. (No model.)

*To all whom it may concern:*

Be it known that I, HORACE M. FULWIDER, of Redmon, in the county of Edgar and State of Illinois, have invented certain new and useful Improvements in Automatic Grain Weighing and Measuring Machines; and I do hereby declare the following to be a full, clear, and exact description of the invention, such as will enable others skilled in the art to which it pertains to make and use it, reference being had to the accompanying drawings, which form part of this specification.

My invention relates to an improvement in automatic grain weighing and measuring machines; and it consists in, first, the combination of the receptacle divided by a partition into two chambers, with a hopper placed above the partition and an operating mechanism whereby the hopper is moved laterally back and forth over it; second, the arrangement and combination of parts, which will be more fully described hereinafter, whereby an automatically-acting machine is produced which is operated entirely by the weight of the grain which is passing through it.

Figure 1 is a perspective of a machine which embodies my invention complete. Fig. 2 is a side elevation of the hopper alone. Fig. 3 is a vertical section of a machine which embodies my invention.

K represents the frame of the automatically weighing and measuring device, which may either be of the shape here shown or any other that may be preferred, and which is preferably made of sheet metal in contradistinction to wood or other similar material.

The pieces of sheet metal which form the ends of the receptacle, the hopper J, and the part P'', are turned inwardly so as to form the flanges A', and the ends of the side pieces are riveted to these flanges, as shown. A heavy band of iron B' passes around the lower part of the receptacle K, and serves as a brace to hold it in the proper shape and to prevent the sheet-iron from bending, as would otherwise be the case. A band C' should also pass around the inside of the receptacle K just above its center, and in this band are made suitable bearings for the two partially-revolving shafts Z, which support the shifting hopper. The receptacle K is divided at its center by two partitions I', which are bent inwardly at their upper ends and stand just far enough apart at their lower ends to allow the partially-revolving shaft G' to freely operate.

The receptacle K is to be attached to the elevator-casing by means of the iron brace L, to the ends of which are secured the bearings M, and in these bearings the knife-edge pivots N of the scale-beam O bear.

The outer portion of the scale-beam O, where the weight J' is applied to it, is made perfectly straight; but the inner portion of the beam is made U-shaped, so as to extend around opposite ends of the receptacle K, which is provided with knife-shaped journals P to catch in suitable bearings made in the inner ends of the scale-beam. This beam turns upon its pivots N, and as the outer end, which carries the weight, rises or falls the receptacle K falls or rises correspondingly.

Secured to opposite ends of the receptacle K and near its lower edges are the bearings Q, in which is journaled the shafts or rods R, and to the inner ends of the rods R are secured the latches S, which alternately hold the bottoms H' in a horizontal position ready to receive the grain, as shown in Fig. 3. To the outer end of each rod R is secured a tripping arm or bar T, and to the inner end of each bar is connected a spring U, the upper end of which is secured to a bolt V, which passes through an L-shaped support L', which is rigidly secured to the side of the receptacle K. The upper end of the bolt V is provided with a nut for the purpose of adjusting the spring U to any desired tension.

The outer end of each of the arms T is connected to a chain X, the upper end of which is fastened to the U-shaped scale-beam O, and as the scale-beam rises and the receptacle descends a pull is exerted on the chain X, which raises the outer end of the trip-arm T, and this motion exerts an outward pressure on the latch S, and consequently the bottom H', which is then forming the bottom of one of the compartments so as to receive the grain upon it, is instantly released and forced downward by the pressure of grain, and this downward motion of one portion of the bottom forces the opposite portion, which was hanging downward, upward into position to form a bottom for the opposite compartment K, and this bottom is caught and held in position by the opposite latch S.

The two alternate bottoms H' are made fast to the partially-revolving shaft G', and are made to stand at about right angles, and when one forms a bottom for one of the compartments K the other stands almost vertically inside of the lower hopper P''. To each of the outer edges of the two bottoms is secured a projecting angular iron bar O'', and these bars are caught alternately by the latches S. Both latches are acted upon by the chain X at the same time, and the instant the grain is discharged from the receptacle the chains become slackened and allow the spring U to act upon the latches S.

In order that the grain may be contracted when it is discharged from the receptacle, a hopper P'' is suspended below the weighing-receptacle by means of the angular iron bar T'', which extends back and is bolted fast to the sides of the elevator-casing. On each side of the hopper P'' is fastened the downwardly-extending bars Z'', and to these bars Z'' is suspended the spout by means of hooks, and this spout directs the grain into the wagon or other receptacle. In the upper portion of the receptacle K is placed the shifting hopper J, which is suspended by the upwardly-extending cranks W. The upper ends of the cranks W are journaled in the bearings Y, which are secured to each side of the upper part of the shifting hopper J, and the lower ends of the cranks W are secured to the partially-revolving shaft Z. Secured to one end of the shaft Z is a crank D', and to this crank is connected a rod E', the lower end of which is connected to a crank F', which is made fast to one end of the partially-revolving shaft G', which is made round on each end where it passes through bearings prepared for it in the receptacle, and triangular shaped where the bottoms H are fastened to it by means of rivets.

Each time that the bottoms are operated the hopper J, which directs the grain from one compartment to the other, is shifted over the compartment having its bottom H' in a horizontal position. A piece of leather D'' is secured on each side of the lower part of the hopper to prevent the grain from bouncing over into the empty compartment K. In order that the receptacle K may not have any swaying motion in its vertical movement, two bent bars M' are riveted to the receptacle K, and to these bars are connected the ends of the bent rods N'. The outer ends of these rods are to be fastened to the elevator-casing in connection with which this automatic grain weighing and measuring machine is to be used.

The sliding weight J' is set for the desired quantity to be weighed, and is then locked in place by means of a set-screw. When the desired quantity of grain has run from the elevator into the receptacle K, that portion of the scale-beam O that carries the weight rises and the receptacle K descends. The chains X exert a pull on the trip-arms, which motion operates the latches S through the rods R, which instantly releases the bottoms H' upon one side of the receptacle and allows the grain to drop into the lower hopper P''. The outer portion of the scale-beam drops when the grain is discharged from the receptacle, and thus it will be seen that as long as the grain continues to run into the receptacle K through the hopper J the weigher will be operated, the grain furnishing all the motive power for operating the same.

Having thus described my invention, I claim—

1. The combination of the receptacle K, the bearings Q, the shafts R, the latches S, bottoms H', and the partially-revolving shaft G', with the trip-arms T, the springs secured to their inner ends, the chains secured to their outer ends, and the scale-beam, substantially as shown.

2. The combination of the receptacle K, the laterally-moving hopper placed in its upper end, suitable partially turning or rotating supports upon which the hopper is supported, a connecting mechanism, and the bottoms H', by means of which the hopper is moved from one side of the partition in the receptacle to the other, substantially as described.

3. The combination of the divided receptacle, the laterally-moving hopper, the cranks connected to the hopper, the shafts Z, to which the lower ends of the cranks are secured, the cranks D' F', the connecting-rod between the cranks, the partially-revolving shaft G', and the bottoms secured thereto, substantially as specified.

In testimony whereof I affix my signature in presence of two witnesses.

HORACE M. FULWIDER.

Witnesses:
WILLIAM W. DANFORD,
COMO TROGDON.